United States Patent [19]
Park

[11] Patent Number: 5,640,515
[45] Date of Patent: Jun. 17, 1997

[54] FIFO BUFFER SYSTEM HAVING ENHANCED CONTROLLABILITY

[75] Inventor: Yong-Gyu Park, Seoul, Rep. of Korea

[73] Assignee: Daewoo Electronics Co., Ltd., Seoul, Rep. of Korea

[21] Appl. No.: 320,710

[22] Filed: Oct. 7, 1994

[30] Foreign Application Priority Data

Oct. 28, 1993 [KR] Rep. of Korea ............... 1993-22615

[51] Int. Cl.$^6$ ........................................ G06F 13/00
[52] U.S. Cl. ................ 395/250; 364/239.6; 364/939.4
[58] Field of Search ............................ 395/775, 800, 395/250

[56] References Cited

U.S. PATENT DOCUMENTS

| | | | |
|---|---|---|---|
| 4,574,351 | 3/1986 | Dang | 395/250 |
| 4,583,163 | 4/1986 | Kobayashi | 395/250 |
| 5,179,661 | 1/1993 | Copeland et al. | 395/250 |

*Primary Examiner*—David Y. Eng
*Attorney, Agent, or Firm*—Anderson Kill & Olick P.C.

[57] ABSTRACT

FIFO buffer system capable of effectively controlling write and read operations thereof comprises N number of cascaded FIFO buffers, each of the cascaded FIFO buffers sequentially storing the input digital data in response to a write signal, sequentially generating the output digital data in response to a read signal and generating storage state signals including a full flag and an empty flag signals representative of the full and empty states thereof, respectively, N being a positive integer larger than 3; a clock for generating a second clock signal; first control means, in response to the full flag signals from the cascaded FIFO buffers, for generating the write signal synchronized with the first clock signal if fewer than (N−1) cascaded FIFO buffers are full; and second control means, in response to the empty flag signals from the cascaded FIFO buffers, for initiating a read operation by generating the read signal synchronized with the second clock if first three cascaded FIFO buffers, which have sequentially stored the input digital data, are not in the empty state, and for terminating the read operation, in response to the write signal and the END signal, after the last bit of the input data is read from the cascaded FIFO buffers.

4 Claims, 3 Drawing Sheets

FIFO BUFFER SYSTEM HAVING ENHANCED CONTROLLABILITY

FIELD OF THE INVENTION

The present invention relates to a First-In-First-Out (FIFO) buffer system; and, more particularly, to an improved FIFO buffer system capable of effectively controlling write and read operations thereof.

DESCRIPTION OF THE PRIOR ART

As is well known, a FIFO buffer system is widely utilized in various electronic/electrical applications. The conventional FIFO buffer system is provided with at least one FIFO buffer memory and is adapted for temporarily storing input digital data transmitted, e.g., in the form of discontinuous bit streams having varying or higher bit rates, which may be converted to a continuous bit stream having a lower constant bit rate.

In order to accomodate bit rate differences between the input and output digital data, the FIFO buffer system generally employs a plurality of FIFO buffer memories due to the limited hardware capacity. In that case, the FIFO buffer memories are arranged in a cascade or depth expansion fashion.

As is well known, in such an arrangement, the input digital data is sequentially stored(or written) into the FIFO buffer memories, and outputted(or read) therefrom in the same manner so as to produce output digital data which is identical to the input digital data.

Since, however, the conventional FIFO buffer system employing such cascaded FIFO buffer memories performs a write or read operation until the FIFO buffer memories therein are completely filled or emptied, there may occur a discrepancy between the write and read sequences of the data if the write and read operations are simultaneously carried out on one of the FIFO buffer memories, thereby producing erroneous output digital data.

SUMMARY OF THE INVENTION

It is, therefore, a primary object of the present invention to provide an improved FIFO buffer system having control units for effectively controlling write and read operations.

In accordance with the invention, there is provided a First-In-First-Out(FIFO) buffer system for temporarily storing input digital data generated from a data generator and generating output digital data having a constant bit rate, wherein the data generator provides a first clock signal and an END signal, indicating the generation of a last bit of the input digital data, which comprises: N number of cascaded FIFO buffers, each of the cascaded FIFO buffers sequentially storing the input digital data in response to a write signal, sequentially generating the output digital data in response to a read signal and generating storage state signals including a full flag and an empty flag signals representative of the full and empty states thereof, respectively, N being a positive integer larger than 3; a clock for generating a second clock signal; first control means, in response to the full flag signals from the cascaded FIFO buffers, for generating the write signal synchronized with the first clock signal if fewer than (N−1) cascaded FIFO buffers are full; and second control means, in response to the empty flag signals from the cascaded FIFO buffers, for initiating a read operation by generating the read signal synchronized with the second clock if first three cascaded FIFO buffers, which have sequentially stored the input digital data, are not in the empty state, and for terminating the read operation, in response to the write signal and the END signal, after the last bit of the input data is read from the cascaded FIFO buffers.

BRIEF DESCRIPTION OF THE DRAWINGS

The above and other objects and features of the instant invention will become apparant from the following description of preferred embodiments taken in conjunction with the accompanying drawings, in which.

DETAILED DESCRIPTION OF THE PREFERRED EMBODIMENTS

Figure 1:
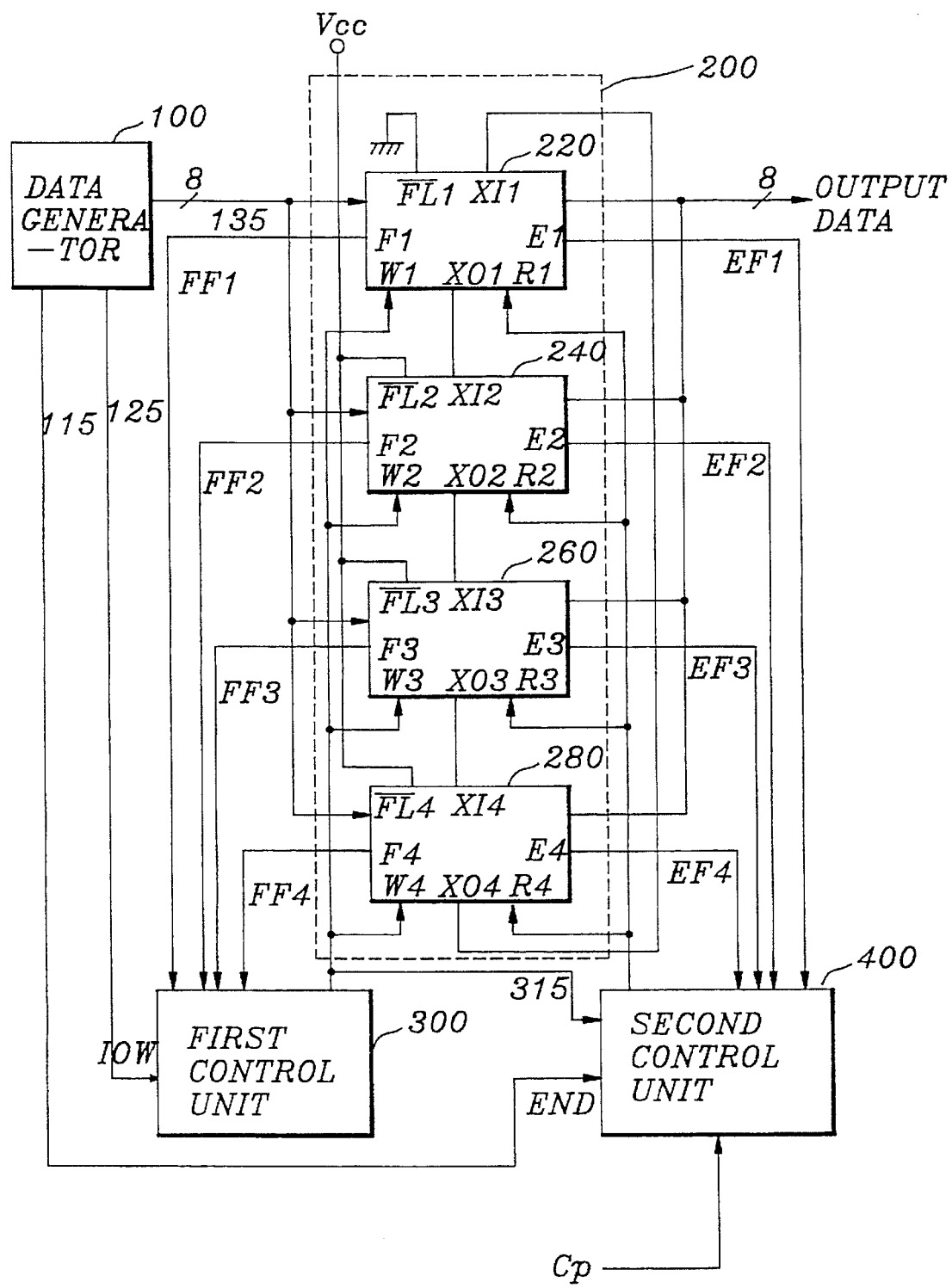
FIG. 1 shows a schematic diagram of a FIFO buffer system in accordance with the present invention.

Referring to FIG. 1, there is shown a block diagram of a FIFO buffer system in accordance with a preferred embodiment of the present invention.

The FIFO buffer system comprises a FIFO module 200, a first control unit 300, and a second control unit 400.

Input digital data is fed to the FIFO module 200 via line 135 in the form of, e.g., discontinuous bit streams having a greater bit rate than that of output digital data thereof. The input digital data is provided from a data generator 100 which provides a data latch clock IOW to the first control unit 300 and an END signal to the second control unit 400 as well through lines 125 and 115, respectively. The END signal from the data generator 100 is logic "high" when all of the input digital data is transferred from the data generator 100 to the FIFO module 200, indicating the end of the bit streams of the input digital data; otherwise, it is logic "low".

The FIFO module 200, which is adapted to generate the output data in the form of a continuous bit stream having a regulated bit rate, performs write and read operations in response to write and read signals generated by the control units 300 and 400, respectively. In accordance with a preferred embodiment of the present invention, the FIFO module 200 includes N, e.g., 4, FIFO buffers, which are coupled in a cascade manner. That is, the cascaded FIFO buffers 220, 240, 260 and 280 perform the write or read operation sequentially.

Each of the FIFO buffers includes expansion-out terminals XO1, XO2, XO3, XO4 and expansion-in terminals XI1, XI2, XI3, XI4, coupled as shown in FIG. 1. That is, XO1 is connected to XI2, XO2 to XI3, XO3 to XI4, and XO4 to XI1. Each of the FIFO buffers also includes first load terminals $\overline{FL1}$, $\overline{FL2}$, $\overline{FL3}$, $\overline{FL4}$, wherein $\overline{FL1}$ is grounded and $\overline{FL2}$, $\overline{FL3}$ and $\overline{FL4}$ are connected to a power source Vcc in order to write the input digital data or read the stored input digital data sequentially, starting from the first cascaded FIFO buffer 220. The FIFO buffers also include full flag terminals F1, F2, F3, F4 and empty flag terminals E1, E2, E3, E4, respectively. Each of the FIFO buffers generates a full flag signal FF1, FF2, FF3 or FF4 with logic "high" when it is full and an empty flag signal EF1, EF2, EF3 or EF4 with logic "high" when it is empty.

The input digital data applied to the FIFO module 200 is sequentially written in the FIFO buffers 220 to 280 when the write signal applied to the write terminals W1, W2, W3, W4 is logic "high", and is read therefrom in the same manner in response to the logic "high" read signal provided to the read terminals R1, R2, R3, R4.

Figure 2:
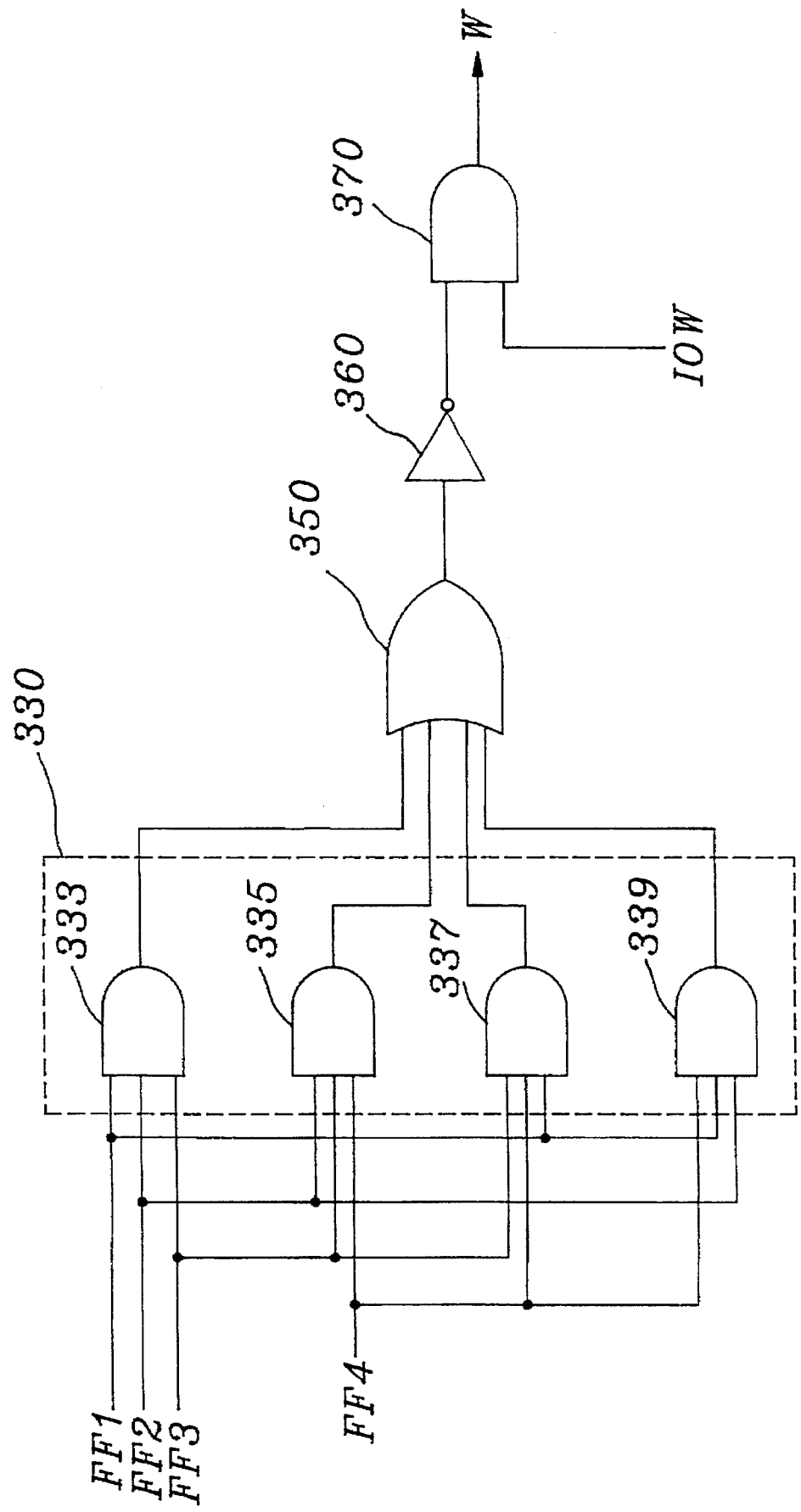
FIG. 2 is a detailed logic circuit of the first control unit shown in FIG. 1.

Referring to FIG. 2, the first control unit 300 shown in FIG. 1 comprises an AND gate group 330 including four AND gates 333, 335, 337, 339, an OR gate 350, an inverter 360, and an AND gate 370. Inputs to each of the AND gates 333 to 339 are one of four different sets of three full flag signals from the FIFO module 200. Each of the inputs of the OR gate 350 is coupled to a respective output of the AND gates 333 to 339, and an output of the OR gate 350 is coupled to a first input of the AND gate 370 through the inverter 360. The AND gate 370 performs a logic AND operation with the first input from the inverter 360 and a second input, i.e., the data latch clock IOW from the data generator 100, to generate the write signal W.

As may be seen from the above, if fewer than three full flag signals are logic "high", the write signal W is the data latch clock IOW; otherwise, the write signal is logic "low". That is, the write operation is performed in accordance with the data latch clock IOW if fewer than three FIFO buffers are full and the write operation on the FIFO module 200 is halted if three or four FIFO buffers therein are full.

Figure 3:
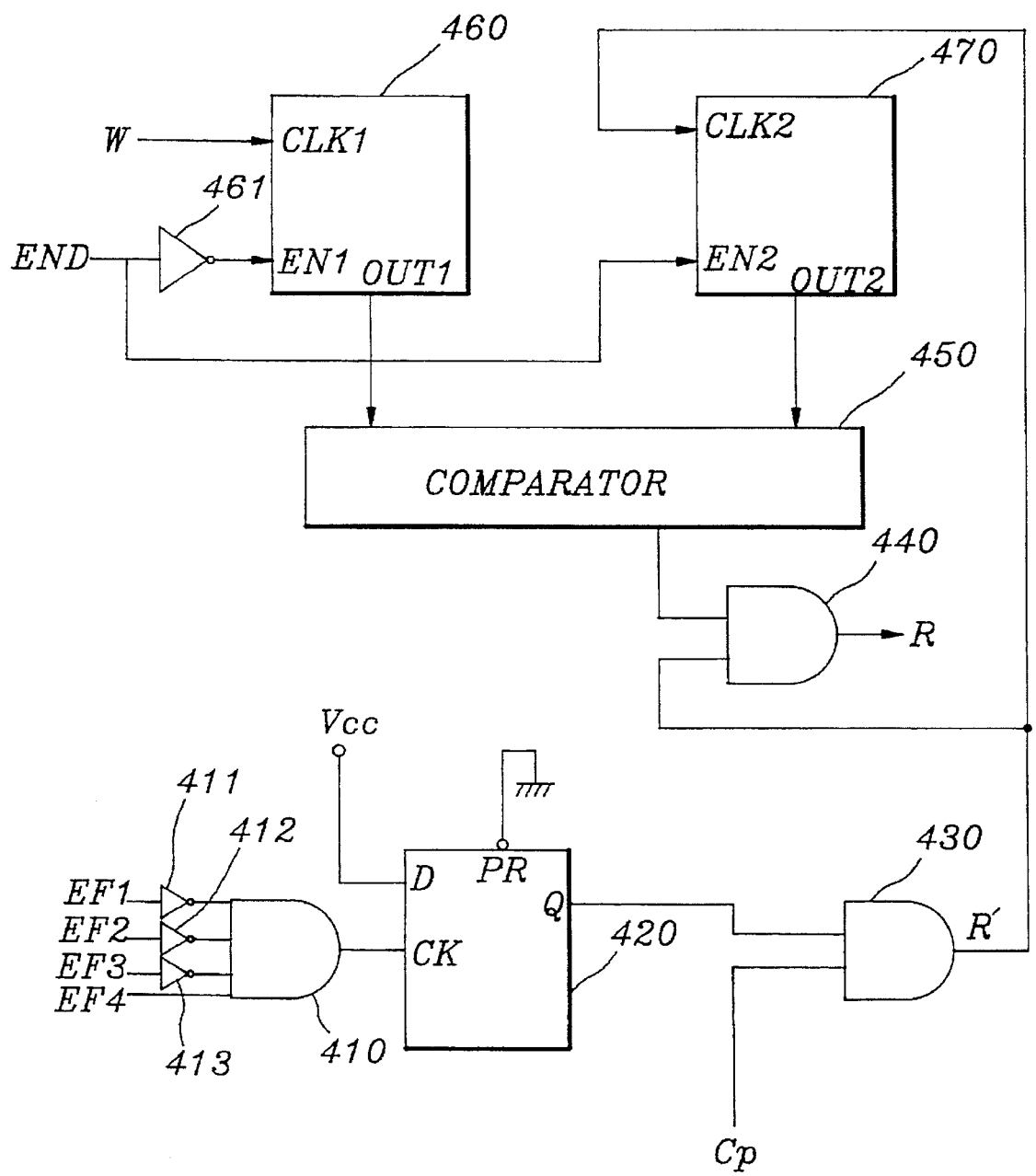
FIG. 3 illustrates a detailed logic circuit representing the second control unit shown in FIG. 1.

FIG. 3 illustrates the details of the second control unit 400 shown in FIG. 1. The write signal W provided from the first control unit 300 is fed to a first counter 460. The END signal is also provided to the first counter 460 through an inverter 461. The first counter 460 is enabled by the logic "high" inverted END signal applied to an enable terminal EN1. The enabled first counter 460, in response to a rising edge of the write signal W applied to a terminal CLK1, increments its count by 1 and simultaneously outputs an incremented count to a comparator 450 through its output terminal OUT1.

In the meantime, the empty flag signals EF1, EF2, EF3 and EF4 provided from the FIFO module 200 shown in FIG. 1 are coupled to a first AND gate 410. Specifically, the empty flag signals EF1, EF2 and EF3 are connected to the first AND gate 410 through inverters 411, 412, 413, respectively, and the empty flag signal EF4 is directly coupled to the first AND gate 410. An output of the first AND gate 410 is coupled to a terminal CK of a flip flop 420, and is logic "high" only if the empty flag signals EF1, EF2 and EF3 are all logic "lows" and the empty flag signal EF4 if logic "high". That is, the output of the first AND gate 410 becomes logic "high" when at least a portion of eoch of the first three FIFO buffers 220, 240 and 260 in FIG. 1 is filled with the input digital data.

The flip flop 420 includes a preset terminal PR connected to ground, and thus outputs at its output terminal Q logic "low" until the output of the first AND gate 410 becomes logic "high". The flip flop 420 also includes an input terminal D connected to the power source Vcc; and, therefore, when the output of the first AND gate 410 becomes logic "high", the output of the flip flop 420 connected to a first input of a second AND gate 430 is set to logic "high" thereafter. The second AND gate 430 performs the logic AND operation with the first input from the flip flop 420 and a second input, i.e., a clock signal Cp applied from a clock generator(not shown). An output R', which is synchronized with the clock signal Cp if the output from the flip flop 420 is logic "high", from the second AND gate 430 is provided to a second counter 470 and a third AND gate 440.

The comparator 450 compares the output count from the first counter 460 and an output count from the second counter 470. An output signal from the comparator 450 is logic "high" if the output counts from the counters 460 and 470 are different; and logic "low" if they are identical. The second counter 470 is enabled by the logic "high" output signal from the comparator 450 applied to an enable terminal EN2 thereof. The enabled second counter 470, in response to the rising edge of output signal R' transmitted via a terminal CLK2 thereof from the second AND gate 430, increments its count by 1 and simultaneously outputs at its output terminal OUT2 the incremented count to the comparator 450.

The output of the comparator 450 is also coupled to the third AND gate 440, which generates the clock signal Cp as the read signal R to the FIFO module 200 as long as the output count from the second counter 470 is smaller than the output count from the first counter 460. Once the write operation is completed, the logic "high" END signal is issued from the data generator 100 and the output count from the first counter 460 is suspended. The read operation is then carried out until the output count from the second counter 470 reaches a value identical to the suspended output count from the first counter 460.

While the present invention has been shown and described in connection with the preferred embodiments thereof, it will be readily apparent to those ordinary skilled in the art that many changes and modifications may be made without departing from the spirit and scope of the invention as defined in the appended claim.

What is claimed is:

1. A First-In-First-Out(FIFO) buffer system for temporarily storing input digital data generated from a data generator and generating output digital data having a constant bit rate, wherein the data generator provides first clock signals, which comprises:

N number of cascaded FIFO buffers, each of the cascaded FIFO buffers sequentially storing the input digital data in response to a write signal, sequentially generating the output digital data in response to a read signal and generating storage state signals including a full flag and an empty flag signals representative of the full and empty states thereof, respectively, N being a positive integer larger than 3;

a clock for generating second clock signals;

first control means for sequentially generating the write signals synchronized with the first clock signals until a predetermined number of the full flag signals is received; and second control means for counting the write signals to generate a write count value; and for sequentially generating the read signals synchronized with the second clock signals until the number of the read signals reaches the write count value or the predetermined number of the empty flag signals is received.

2. The First-In-First-Out(FIFO) buffer system as recited in claim 1, wherein the first control means includes:

first logic means, which receives the full flag signals, for generating a first control signal when the number of the received full flag signals is smaller than the predetermined number; and second logic means, in response to the first control signal, for sequentially generating the first clock signals as the write signals.

3. The First-In-First-Out(FIFO) buffer system as recited in claim 2, wherein the second control means includes:

first counting means, which receives the write signals, for counting the number of the received write signals to generate a write count value;

third logic means, which receives the empty flag signals, for generating a second control signal when the number of the received empty flag signals is smaller than the predetermined number;

fourth logic means, in response to the second control signal, for generating the second clock signals as the read signals;

second counting means, which receives the read signals, for counting the received read signals to generate a read count value;

means for comparing the read count value and the write count value to generate a third control signal; and fifth logic means, in response to the third control signal, for blocking the generation of the read signals.

4. The First-In-First-Out(FIFO) buffer system as recited in claim 3, wherein N is 4 and the predetermined number of the full flag and the empty flag signal is 3, respectively.

* * * * *